US012129810B2

(12) United States Patent
Sperry et al.

(10) Patent No.: US 12,129,810 B2
(45) Date of Patent: Oct. 29, 2024

(54) SYSTEM AND METHOD FOR DEBURRED PORT HOLES IN A TWO-STROKE ENGINE

(71) Applicant: Cummins Inc., Columbus, IN (US)

(72) Inventors: Robert G. Sperry, Columbus, IN (US); Jordan E. Kelleher, Columbus, IN (US); Jeffrey A. Wheitner, Columbus, IN (US); Jeffrey D. Olmstead, Columbus, IN (US); Myron T. Rickard, Seymour, IN (US); David J. Eckroth, Columbus, IN (US)

(73) Assignees: Cummins Inc., Columbus, IN (US); ACHATES POWER INC., San Diego, CA (US)

( * ) Notice: Subject to any disclaimer, the term of this patent is extended or adjusted under 35 U.S.C. 154(b) by 0 days.

(21) Appl. No.: 18/034,237

(22) PCT Filed: Oct. 8, 2021

(86) PCT No.: PCT/US2021/054120
§ 371 (c)(1),
(2) Date: Apr. 27, 2023

(87) PCT Pub. No.: WO2022/108679
PCT Pub. Date: May 27, 2022

(65) Prior Publication Data

US 2023/0399994 A1 Dec. 14, 2023

Related U.S. Application Data

(60) Provisional application No. 63/107,895, filed on Oct. 30, 2020.

(51) Int. Cl.

| | |
|---|---|
| ***F02F 1/22*** | (2006.01) |
| ***F02B 75/28*** | (2006.01) |
| *F02B 75/02* | (2006.01) |

(52) U.S. Cl.
CPC ................ *F02F 1/22* (2013.01); *F02B 75/28* (2013.01); *F02B 2075/025* (2013.01); *F02F 2200/06* (2013.01)

(58) Field of Classification Search
CPC ......... F02F 1/22; F02F 2200/06; F02B 75/28; F02B 2075/025; B22D 15/02; B22D 19/00
See application file for complete search history.

(56) References Cited

U.S. PATENT DOCUMENTS

| | | | |
|---|---|---|---|
| 4,894,597 | A | 1/1990 | Ohtomi |
| 4,993,896 | A | 2/1991 | Dombrowski et al. |

(Continued)

FOREIGN PATENT DOCUMENTS

| | | | |
|---|---|---|---|
| CN | 108672828 | A | 10/2018 |
| DE | 3738619 | A1 | 6/1989 |

OTHER PUBLICATIONS

Copy of International Search Report and Written Opinion for International patent application No. PCT/US2021/054120, filed Oct. 8, 2021, mailed Jun. 8, 2022.

*Primary Examiner* — Sizo B Vilakazi
(74) *Attorney, Agent, or Firm* — Faegre Drinker Biddle & Reath LLP

(57) ABSTRACT

A method for finishing at least one port within a cylinder of a two-stroke engine, comprising tracing a curvature of an existing port hole for the at least one port using a force sensing tool, wherein forming an engine block for a two-stroke engine, comprising: casting the engine block, wherein the cast engine block includes at least one intake port and at least one exhaust port; rough machining a cylinder of the engine block, wherein at least one of the at least one intake port and the at least one exhaust port is positioned along a wall of the cylinder and both of the at least one intake port and the at least one exhaust port are fluidly coupled to the (Continued)

cylinder; and finishing an edge of at least one of the at least one intake port and the at least one exhaust port to provide a smooth surface.

20 Claims, 2 Drawing Sheets

(56) References Cited

U.S. PATENT DOCUMENTS

| | | | | |
|---|---|---|---|---|
| 5,126,645 | A | 6/1992 | Yoshimi et al. | |
| 5,548,194 | A | 8/1996 | Hamura et al. | |
| 7,458,153 | B2 * | 12/2008 | Uhl | F02F 1/22<br>29/888.06 |
| 8,146,546 | B2 * | 4/2012 | Yuasa | F02B 25/22<br>123/73 A |
| 8,726,859 | B2 * | 5/2014 | Yuasa | F02B 25/06<br>123/585 |
| 2003/0097751 | A1 * | 5/2003 | Klaric | F02B 77/02<br>29/888.06 |
| 2004/0221830 | A1 | 11/2004 | Kuehner | |
| 2005/0166396 | A1 | 8/2005 | Brockel | |
| 2011/0016956 | A1 * | 1/2011 | Igasaki | G01B 7/012<br>73/105 |
| 2011/0016995 | A1 | 1/2011 | Igasaki | |
| 2016/0109307 | A1 | 4/2016 | Pieronek | |
| 2020/0149493 | A1 | 5/2020 | Perr et al. | |

* cited by examiner

SYSTEM AND METHOD FOR DEBURRED PORT HOLES IN A TWO-STROKE ENGINE

CROSS-REFERENCE TO RELATED APPLICATIONS

This application claims priority to and is a U.S. national stage application of International Patent Application No. PCT/US2021/054120, filed Oct. 8, 2021, which claims priority to U.S. Provisional No. 63/107,895, entitled "SYSTEM AND METHOD FOR DEBURRED PORT HOLES IN AN OPPOSED-PISTON TWO-STROKE ENGINE," filed on Oct. 30, 2020, the entire disclosures of which being expressly incorporated herein by their reference.

STATEMENT REGARDING FEDERALLY SPONSORED RESEARCH OR DEVELOPMENT

This invention was made with government support under Other Transaction Authority (OT) agreement number W56HZV-16-9-0001, awarded by the United States Army. The government has certain rights in the invention.

TECHNICAL FIELD OF THE DISCLOSURE

The present disclosure relates to a system and method for deburred port holes, and specifically to a system and method for deburred port holes in an opposed-piston two-stroke engine.

BACKGROUND OF THE DISCLOSURE

A two-stroke engine includes an engine block having at least one cylinder with port holes within a wall of each cylinder, where at least one port hole provides fresh air (or an air/fuel mixture) into a combustion chamber of the cylinder and at least one port hole allows exhaust gas to leave the combustion chamber. The engine block of the two-stroke engine is often cast and/or machined. However, the casting and/or machining of the cylinder block often leaves jagged edges and/or burs on the surface of the port holes. These jagged edges and/or burs can lead to scoring damage on the piston and/or piston rings and/or debris within the cylinder, which can lead to performance issues and/or engine failure. Thus, a need exists for port holes with improved surface features in a two-stroke engine.

SUMMARY OF THE DISCLOSURE

In one embodiment, the present disclosure provides a method for forming an engine block for a two-stroke engine, comprising: casting the engine block, wherein the cast engine block includes at least one intake port and at least one exhaust port; rough machining a cylinder of the engine block, wherein at least one of the at least one intake port and the at least one exhaust port is positioned along a wall of the cylinder and both of the at least one intake port and the at least one exhaust port are fluidly coupled to the cylinder; and finishing an edge of at least one of the at least one intake port and the at least one exhaust port to provide a smooth surface. One aspect of this embodiment further comprises machining and honing a shape of the cylinder before finishing the edge of the at least one of the at least one intake port and the at least one exhaust port. In another aspect, the finishing of the edge of at least one of the at least one intake port and the at least one exhaust port to provide a smooth surface includes tracing a curvature of an existing port hole for the at least one intake port and the at least one exhaust port with a force-sensing tool. In a variant of this aspect, the curvature is traced with the force-sensing tool in more than one plane. In another variant, the force-sensing tool includes at least one of at least one force feedback sensor and a pilot. In a further variant, the force-sensing tool is controlled by a robotic arm. In yet another variant of this aspect, the force-sensing tool is a pressure-sensing cutter configured to detect cutter speed based on at least one of pressure and force. In another aspect of this embodiment, the cylinder block is configured for a two-stroke opposed-piston engine.

In another embodiment, the present disclosure provides a method for finishing at least one port within a cylinder of a two-stroke engine, comprising: tracing a curvature of an existing port hole for the at least one port using a force-sensing tool. In one aspect of this embodiment, the curvature is traced with the force-sensing tool in more than one plane. In another aspect, the force-sensing tool includes at least one of at least one force feedback sensor and a pilot. In still another aspect, the force-sensing tool is controlled by a robotic arm. In yet another aspect of this embodiment, the force-sensing tool is a pressure-sensing cutter configured to detect cutter speed based on at least one of pressure and force. In another aspect, the at least one port is positioned along a wall of the cylinder. In another aspect, the engine is a two-stroke opposed piston engine.

In yet another embodiment of the present disclosure, a method for forming an engine block for a two-stroke engine is provided, comprising: machining a cylinder of the engine block, wherein at least one of at least one intake port and at least one exhaust port is positioned along a wall of the cylinder and both of the at least one intake port and the at least one exhaust port are fluidly coupled to the cylinder; applying at least one of a coating and a liner to the wall of the cylinder; and finishing an edge of at least one of the at least one intake port and the at least one exhaust port to provide a smooth surface. In one aspect of this embodiment, the finishing of the edge of at least one of the at least one intake port and the at least one exhaust port to provide a smooth surface includes tracing a curvature of an existing port hole for the at least one intake port and the at least one exhaust port with a force-sensing tool. In another aspect, the engine block is configured for a two-stroke opposed-piston engine.

In still another embodiment, a two-stroke engine is provided, comprising: a cast engine block including at least one intake port and at least one exhaust port; and a cylinder formed by rough machining the cast engine block; wherein at least one of the at least one intake port and the at least one exhaust port is positioned along a wall of the cylinder and both of the at least one intake port and the at least one exhaust port are fluidly coupled to the cylinder; wherein at least one of the at least one intake port and the at least one exhaust port includes a finished edge to provide a smooth surface. In one aspect of this embodiment, the engine block is configured for a two-stroke opposed-piston engine.

Advantages and features of the embodiments of this disclosure will become more apparent from the following detailed description of exemplary embodiments when viewed in conjunction with the accompanying drawings.

BRIEF DESCRIPTION OF THE DRAWINGS

Corresponding reference characters indicate corresponding parts throughout the several views. The exemplification set out herein illustrates an exemplary embodiment of the disclosure and such exemplification is not to be construed as limiting the scope of the disclosure in any manner.

DETAILED DESCRIPTION OF THE DRAWINGS

Figure 1:
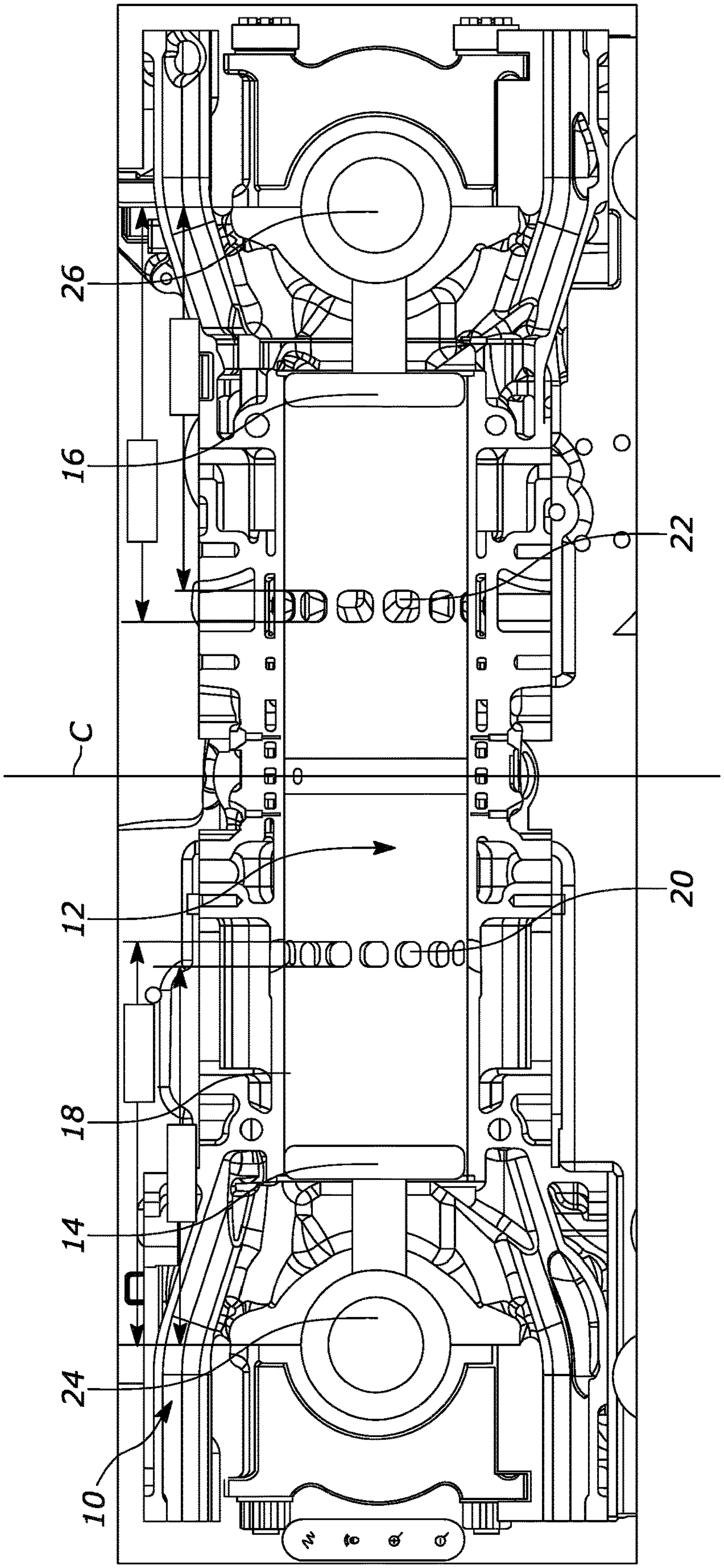
FIG. 1 shows a cross-sectional view of a cylinder of an opposed-piston two-stroke engine.

For the purposes of promoting an understanding of the principles of the present disclosure, reference is now made to the embodiments illustrated in the drawings, which are described below. The exemplary embodiments disclosed herein are not intended to be exhaustive or to limit the disclosure to the precise form disclosed in the following detailed description. Rather, these exemplary embodiments were chosen and described so that others skilled in the art may utilize their teachings.

The terms "couples," "coupled," and variations thereof are used to include both arrangements wherein two or more components are in direct physical contact and arrangements wherein the two or more components are not in direct contact with each other (e.g., the components are "coupled" via at least a third component), but yet still cooperate or interact with each other. Furthermore, the terms "couples," "coupled," and variations thereof refer to any connection for machine parts known in the art, including, but not limited to, connections with bolts, screws, threads, magnets, electromagnets, adhesives, friction grips, welds, snaps, clips, etc.

Throughout the present disclosure and in the claims, numeric terminology, such as first and second, is used in reference to various components or features. Such use is not intended to denote an ordering of the components or features. Rather, numeric terminology is used to assist the reader in identifying the component or features being referenced and should not be narrowly interpreted as providing a specific order of components or features.

In the following description, one type of two-stroke engine is described as an example application of the present disclosure. Specifically, reference is made to an opposed-piston two-stroke engine throughout. It should be understood, however, that the principles of the present disclosure are applicable to other types of two-stroke engines, whether compression-ignited or spark-ignited. Additionally, while an engine block is described below as having at least one intake port and at least one exhaust port positioned along a wall of the cylinder of the engine block, it should be understood that the methods described below may be used with different engine block configurations. For example, but without limitation, the methods may be used with a two-stroke engine block having a poppet valve that controls flow (typically exhaust flow) out of the top of the cylinder through a head. In such a configuration, only one of the at least one intake port and the at least one exhaust port is positioned along a wall of the cylinder.

Referring to FIG. 1, a cross-section of an engine block 10 of an opposed-piston two-stroke engine is shown. Engine block 10 generally includes at least one cylinder 12 having an intake piston 14 at a first end of cylinder 12, an exhaust piston 16 at a second end of cylinder 12 opposite the first end, at least one fuel injector (not shown) positioned along a wall 18 of cylinder 12, at least one intake port 20 positioned along wall 18, and at least one exhaust port 22 positioned along wall 18. Intake piston 14 is operatively coupled to an intake crankshaft 24 of engine 10 and exhaust piston 16 is operatively coupled to an exhaust crankshaft 26 of engine 10. In various embodiments, pistons 14 and 16 may include at least one piston ring (not shown).

The fuel injector(s) for cylinder 12 are configured to inject metered quantities of fuel into cylinder 12 in timed relation to the reciprocation of pistons 14 and 16, while intake port(s) 20 are configured to provide the necessary fresh air to cylinder 12 for a combustion event to occur. Exhaust port(s) 22 are configured to allow exhaust created by the combustion event to leave cylinder 12 once exhaust piston 16 has passed exhaust port(s) 22 after the combustion event has occurred. As such, intake port(s) 20 are positioned to a first side of cylinder centerline C and exhaust port(s) 22 are positioned on a second side of cylinder centerline C that is opposite the first side. Intake port(s) 20 and exhaust port(s) 22 are each positioned along wall 18 at positions spaced apart from either outer edge of cylinder 12.

Figure 2:
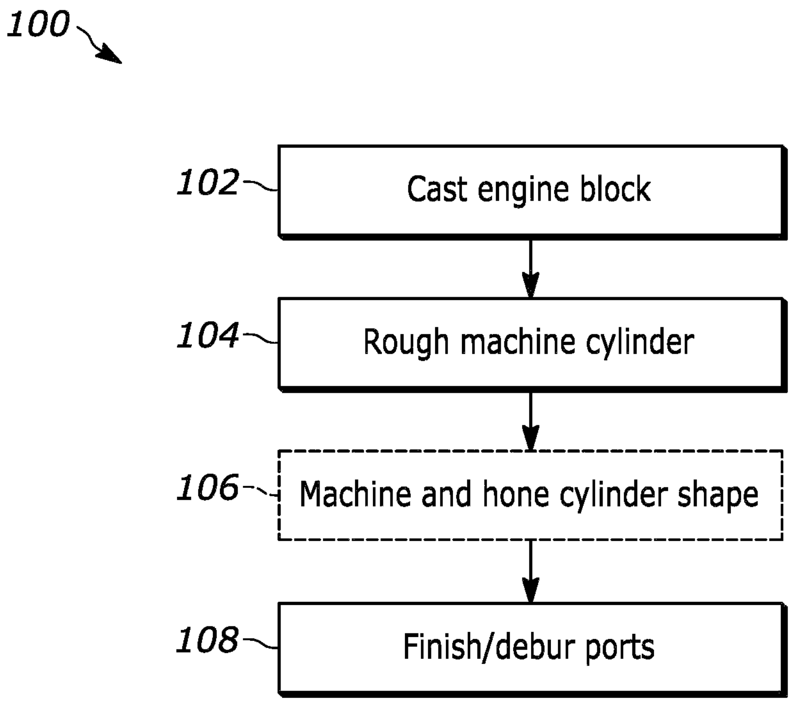
FIG. 2 shows an exemplary flow diagram for a method of forming a new engine block of the opposed-piston two-stroke engine.
Figure 3:
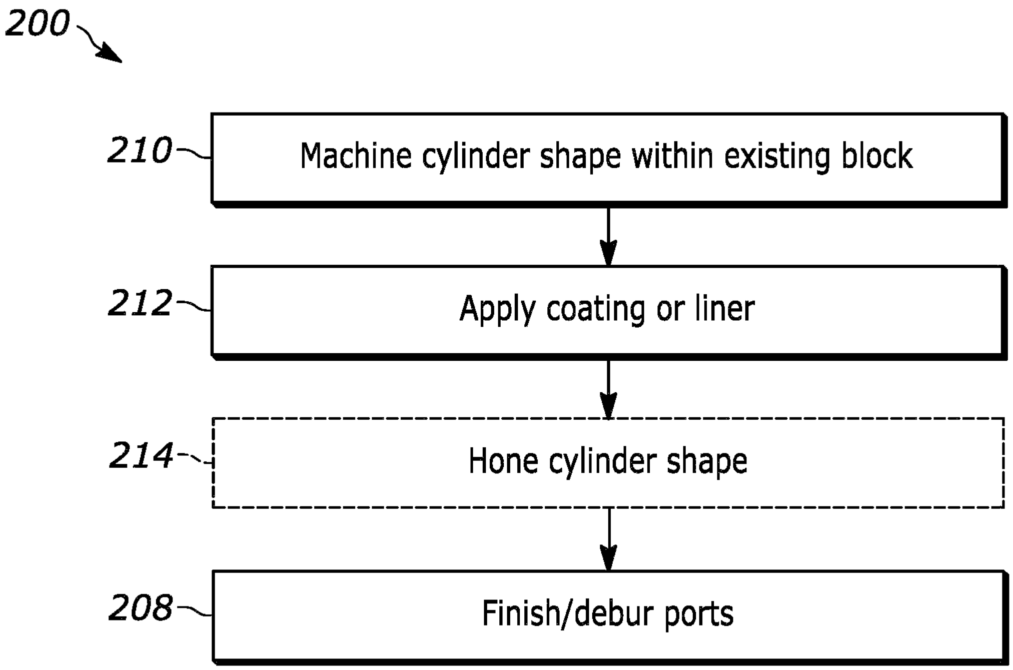
FIG. 3 shows an exemplary flow diagram for a method of forming a remanufactured engine block of the opposed-piston two-stroke engine.

With reference to FIGS. 2 and 3, methods 100 and 200 for forming engine block will now be described. Methods 100 and 200 are configured to provide a smooth internal surface with the rough edges and/or burs on a surface or edge of intake port(s) 20 and/or exhaust port(s) 22 removed to protect pistons 14 and 16 and/or the piston rings thereon from damage and prevent debris from entering cylinder 12. Method 100 includes the steps for forming a new engine block 10, while method 200 includes the steps for forming a remanufactured engine block 10'.

Method 100 begins at step 102 where engine block 10 is cast with intake port(s) and exhaust port(s) 22 being formed or cast in block 10 as part of the casting. Method 100 continues at step 104 wherein cylinder(s) 12 is machined into block 10 such that intake port(s) 20 and exhaust port(s) 22 are fluidly coupled to cylinder 12. In various embodiments, a shape of cylinder(s) 12 may then be machined and honed at step 106. The machining and honing at step 106 may include creating a cross hatch on an interior surface 30 of wall 18 of cylinder 12 that supports a lubrication process within cylinder 12 for intake and exhaust pistons 14 and 16. The honing of cylinder(s) 12 may include the use of honing stones that rotate at a given pressure and rate that create a desired surface finish for cylinder 12. Method 100 then continues at step 108 where intake port(s) 20 and exhaust port(s) 22 are finished. Step 108 may be carried out by a device or tool being applied to round edges of ports 20 and 22 down so that the burs are removed and the edges are smooth.

Method 200 begins at step 110 where a shape of cylinder 12 is machined within existing block 10. At step 112, method 200 continues with a liner being inserted into cylinder 12 or a coating being applied to cylinder 12. In various embodiments, method 200 may then continue at step 114 when the shape of cylinder 12 is honed. Finally, similar to method 100, method 200 finishes at step 208 where intake port(s) 20 and exhaust port(s) 22 are finished to remove any rough edges and/or burs. Similar to step 108, step 208 may be carried out by a device or tool being applied to round edges of ports 20 and 22 down so that the burs are removed and the edges are smooth.

In various embodiments, the device or tool applied to round edges is a pressure or force-sensing tool configured to trace or move along a curvature or edge of ports 20 and/or 22 on more than one plane using pressure or force readings to adjust a path of the tool. To trace or move along the curvature or edge of ports 20 and/or 22, the force-sensing device may include force feedback sensors and/or a pilot that follows the cast port shape of ports 20 and/or 22. In various embodiments, the force-sensing device or tool may be a pressure-sensing cutter, which allows for less wear and smaller bend radius as compared to a grinder. When the force-sensing device is a pressure-sensing cutter, the force-sensing device may further be configured to detect cutter speed depth based on force.

In various embodiments, the device or tool used to finish and/or deburr ports 20 and 22 may be controlled by a robotic arm that is capable of adjusting an exact position of the finishing and/or deburring based on the placement of ports 20 and 22 which may vary due to casting variations. The robotic arm allows the force-adjusting tool to enter port 20 or port 22 and trace the edge of port 20 or port 22 using force sensing technology of the force-adjusting tool.

The robotic arm and/or the force-sensing tool may not only be used for finishing/deburring, but also for retracing port shapes on a sleeved re-manufactured bore, as discussed above.

While various embodiments of the disclosure have been shown and described, it is understood that these embodiments are not limited thereto. The embodiments may be changed, modified and further applied by those skilled in the art. For instance, the present disclosure may further be applied to fuel injectors in other various types of combustion engines. Therefore, these embodiments are not limited to the detail shown and described previously, but also include all such changes and modifications.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more."

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic with the benefit of this disclosure in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for forming an engine block for a two-stroke engine, comprising:

casting the engine block, wherein the cast engine block includes at least one intake port and at least one exhaust port;

rough machining a cylinder of the engine block, wherein at least one of the at least one intake port and the at least one exhaust port is positioned along a wall of the cylinder and both of the at least one intake port and the at least one exhaust port are fluidly coupled to the cylinder; and finishing an edge of at least one of the at least one intake port and the at least one exhaust port to provide a smooth surface;

wherein the finishing the edge of at least one of the at least one intake port and the at least one exhaust port to provide the smooth surface includes tracing a curvature of an existing port hole for the at least one intake port and the at least one exhaust port.

2. The method of claim 1, further comprising machining and honing a shape of the cylinder before finishing the edge of the at least one of the at least one intake port and the at least one exhaust port.

3. The method of claim 1, wherein tracing the curvature of the existing port hole for the at least one intake port and the at least one exhaust port includes tracing with a force-sensing tool.

4. The method of claim 3, wherein the curvature is traced with the force-sensing tool in more than one plane.

5. The method of claim 3, wherein the force-sensing tool includes at least one of at least one force feedback sensor and a pilot.

6. The method of claim 3, wherein the force-sensing tool is controlled by a robotic arm.

7. The method of claim 3, wherein the force-sensing tool is a pressure-sensing cutter configured to detect cutter speed based on at least one of pressure and force.

8. The method of claim 1, wherein finishing the edge of at least one of the at least one intake port and the at least one exhaust port includes use of a force-sensing tool.

9. A method for finishing at least one port within a cylinder of a two-stroke engine, comprising:

tracing a curvature of an existing port hole for the at least one port using a force-sensing tool.

10. The method of claim 9, wherein the curvature is traced with the force-sensing tool in more than one plane.

11. The method of claim 9, wherein the force-sensing tool includes at least one of at least one force feedback sensor and a pilot.

12. The method of claim 9, wherein the force-sensing tool is controlled by a robotic arm.

13. The method of claim 9, wherein the force-sensing tool is a pressure-sensing cutter configured to detect cutter speed based on at least one of pressure and force.

14. The method of claim 9, wherein the at least one port is positioned along a wall of the cylinder.

15. The method of claim 9, wherein the engine is a two-stroke opposed piston engine.

16. A method for forming an engine block for a two-stroke engine, comprising:

machining a cylinder of the engine block, wherein at least one of at least one intake port and at least one exhaust port is positioned along a wall of the cylinder and both of the at least one intake port and the at least one exhaust port are fluidly coupled to the cylinder;

applying at least one of a coating and a liner to the wall of the cylinder; and finishing an edge of at least one of the at least one intake port and the at least one exhaust port to provide a smooth surface;

wherein the finishing the edge of at least one of the at least one intake port and the at least one exhaust port to provide the smooth surface includes tracing a curvature of an existing port hole for the at least one intake port and the at least one exhaust port.

17. The method of claim 16, wherein tracing the curvature of the existing port hole for the at least one intake port and the at least one exhaust port includes tracing with a force-sensing tool.

18. The method of claim 16, wherein the engine block is configured for a two-stroke opposed-piston engine.

19. A two-stroke engine, comprising:

a cast engine block including at least one intake port and at least one exhaust port; and a cylinder formed by rough machining the cast engine block; wherein at least one of the at least one intake port and the at least one exhaust port is positioned along a wall of the cylinder and both of the at least one intake port and the at least one exhaust port are fluidly coupled to the cylinder;

wherein at least one of the at least one intake port and the at least one exhaust port includes a finished edge to provide a smooth surface and wherein the finishing the edge of at least one of the at least one intake port and the at least one exhaust port to provide the smooth surface includes tracing a curvature of an existing port hole for the at least one intake port and the at least one exhaust port.

20. The two-stroke engine of claim 19, wherein the engine block is configured for a two-stroke opposed-piston engine.

* * * * *